(12) United States Patent
Jiang et al.

(10) Patent No.: US 12,042,929 B2
(45) Date of Patent: Jul. 23, 2024

(54) SENSING ASSEMBLY, FORCE AND TORQUE SENSOR ASSEMBLY, ROBOT JOINT AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Hao Jiang, Santa Clara, CA (US); Shuhan Li, Santa Clara, CA (US)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 0 days.

(21) Appl. No.: 17/610,656

(22) PCT Filed: Jun. 17, 2021

(86) PCT No.: PCT/CN2021/100549
§ 371 (c)(1),
(2) Date: Nov. 11, 2021

(87) PCT Pub. No.: WO2022/261887
PCT Pub. Date: Dec. 22, 2022

(65) Prior Publication Data
US 2024/0033946 A1 Feb. 1, 2024

(51) Int. Cl.
*B25J 13/08* (2006.01)
*B25J 17/00* (2006.01)
(52) U.S. Cl.
CPC ............. *B25J 13/085* (2013.01); *B25J 17/00* (2013.01)

(58) Field of Classification Search
CPC .................................. B25J 13/085; B25J 17/00
USPC ....................................................... 73/862.69
See application file for complete search history.

(56) References Cited

U.S. PATENT DOCUMENTS

| 4,866,854 A | * | 9/1989 | Seltzer | .................. | B23P 19/105 33/561 |
| 6,581,480 B1 | | 6/2003 | May et al. | | |

(Continued)

FOREIGN PATENT DOCUMENTS

| CN | 101539463 A | 9/2009 |
| CN | 101720424 A | 6/2010 |

(Continued)

OTHER PUBLICATIONS

International Search Report from International Application No. PCT/CN2021/100549 mailed Mar. 15, 2022.

(Continued)

*Primary Examiner* — Octavia Davis Hollington
*Assistant Examiner* — Monica S Young
(74) *Attorney, Agent, or Firm* — Dorsey & Whitney LLP (57) ABSTRACT

A sensing assembly includes a magnet assembly configured to be coupled to a first component and a pair of hall-effect sensors configured to be coupled to a second component. The pair of hall-effect sensors are configured to generate substantially identical signal changes in response to a first relative motion in a first direction between the magnet assembly and the pair of hall-effect sensors, and to generate substantially equal but opposite signal changes in response to a second relative motion in a second direction between the magnet assembly and the pair of sensors. The first direction is perpendicular to the second direction.

12 Claims, 7 Drawing Sheets

(56) References Cited

U.S. PATENT DOCUMENTS

| | | | | |
|---|---|---|---|---|
| 2009/0241691 | A1* | 10/2009 | Bernstein | G01L 1/165 |
| | | | | 73/862.331 |
| 2010/0175487 | A1* | 7/2010 | Sato | G01L 5/164 |
| | | | | 73/862.69 |
| 2012/0205931 | A1* | 8/2012 | Ohta | G01L 5/226 |
| | | | | 294/213 |
| 2014/0000388 | A1* | 1/2014 | Sato | G01L 1/04 |
| | | | | 73/862.642 |
| 2017/0276513 | A1* | 9/2017 | Lee | G01D 5/145 |
| 2018/0099421 | A1* | 4/2018 | Ogata | G01L 5/009 |
| 2019/0064015 | A1* | 2/2019 | Wang | G01L 3/104 |
| 2020/0001472 | A1* | 1/2020 | Jiang | B25J 15/08 |
| 2020/0003645 | A1* | 1/2020 | Jiang | G01L 3/101 |

FOREIGN PATENT DOCUMENTS

| | | | | |
|---|---|---|---|---|
| CN | 101779110 | A * | 7/2010 | G01L 1/14 |
| CN | 101779110 | A | 7/2010 | |
| CN | 102645302 | A | 8/2012 | |
| CN | 107218954 | A | 9/2017 | |
| CN | 206772482 | U | 12/2017 | |
| CN | 110462357 | A | 11/2019 | |
| CN | 111183007 | A | 5/2020 | |
| CN | 111183337 | A | 5/2020 | |
| CN | 111595505 | A | 8/2020 | |
| CN | 111829714 | A | 10/2020 | |
| GB | 9603685 | | 4/1996 | |
| GB | 2310495 | A | 8/1997 | |
| JP | 2004325328 | A | 11/2004 | |
| JP | 2006162576 | A | 6/2006 | |

OTHER PUBLICATIONS

Office Action for Chinese Patent Application No. 202110670753.3 mailed Apr. 1, 2022.

U.S. Appl. No. 16/456,562, filed Jun. 28, 2019.

* cited by examiner

SENSING ASSEMBLY, FORCE AND TORQUE SENSOR ASSEMBLY, ROBOT JOINT AND ROBOT

CROSS REFERENCE TO RELATED APPLICATIONS

The application is a national stage of international application No. PCT/CN2021/100549, filed Jun. 17, 2021, the content of which is incorporated herein by reference in its entirety.

TECHNICAL FIELD

The present disclosure generally relates to sensing technology, and more particularly to a sensing assembly, a force and torque sensor assembly, a robot joint and a robot.

BACKGROUND

Hall-effect sensors are used to detect motions or positions in various applications. The hall-effect sensor picks up a magnetic field change caused by a structural deflection due to a force or torque load, and generate an electrical signal that can be mapped to the force or torque load. An existing sensor assembly uses one set of magnets and one set of hall-effect sensors on the same side of the magnets. This configuration is prevalent on position encoders. However, due to the nonlinear effect of magnetic field strength change with respect to the motion between the hall-effect sensors and the magnets in some cases, the linearity of the entire sensing signal can be impaired.

SUMMARY

According to one aspect of the present disclosure, there is provided a sensing assembly configured to detect a relative motion between a first component and a second component. The sensing assembly includes a magnet assembly configured to be coupled to the first component and a pair of hall-effect sensors configured to be coupled to the second component. The pair of hall-effect sensors are configured to generate substantially identical signal changes in response to a first relative motion in a first direction between the magnet assembly and the pair of hall-effect sensors, and to generate substantially equal but opposite signal changes in response to a second relative motion in a second direction between the magnet assembly and the pair of sensors. The first direction is perpendicular to the second direction.

According to another aspect of the present disclosure, there is provided a force and torque sensor assembly configured to detect a force or a torque applied thereon. The force and torque sensor assembly includes a body that includes a first component, a second component and a deformable member connecting the first component and second components, and at least one sensing assembly mounted to the body and configured to detect a relative motion between the first component and the second component. The at least one sensing assembly includes a magnet assembly coupled to the first component and a pair of hall-effect sensors coupled to the second component. The pair of hall-effect sensors are configured to generate substantially identical signal changes in response to a first relative motion in a first direction between the magnet assembly and the pair of sensors, and to generate substantially equal but opposite signal changes in response to a second relative motion in a second direction between the magnet assembly and the pair of sensors. The first direction being perpendicular to the second direction.

According to yet another aspect of the present disclosure, there is provided a robot joint which includes a force and torque sensor assembly configured to detect a force or a torque applied thereon. The force and torque sensor assembly includes a body that includes a first component, a second component and a deformable member connecting the first component and second components, and at least one sensing assembly mounted to the body and configured to detect a relative motion between the first component and the second component. The at least one sensing assembly includes a magnet assembly coupled to the first component and a pair of hall-effect sensors coupled to the second component. The pair of hall-effect sensors are configured to generate substantially identical signal changes in response to a first relative motion in a first direction between the magnet assembly and the pair of sensors, and to generate substantially equal but opposite signal changes in response to a second relative motion in a second direction between the magnet assembly and the pair of sensors. The first direction being perpendicular to the second direction.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure.

DETAILED DESCRIPTION OF THE EMBODIMENTS

Aspects and advantages of the invention will be set forth in part in the following description, or may be obvious from the description, or may be learned through practice of the invention.

The present disclosure provides a force and torque sensor assembly for detecting a force or torque applied thereon. The force and torque sensor assembly includes a body and at least one sensing assembly. The body includes a first component, a second component, and a deformable member connecting the first component and the second component. The at least one sensing assembly is mounted to the body to detect a relative motion between the first component and the second component. The at least one sensing assembly includes a magnet assembly connected to the first component and a pair of hall-effect sensors connected to the second component. The pair of hall-effect sensors are configured to generate substantially identical signal changes in response to a first relative motion in a first direction between the magnet assembly and the pair of hall-effect sensors, and to generate substantially equal but opposite signal changes in response to a second relative motion in a second direction between the magnet assembly and the pair of sensors. The first direction is perpendicular to the second direction.

Figure 1:
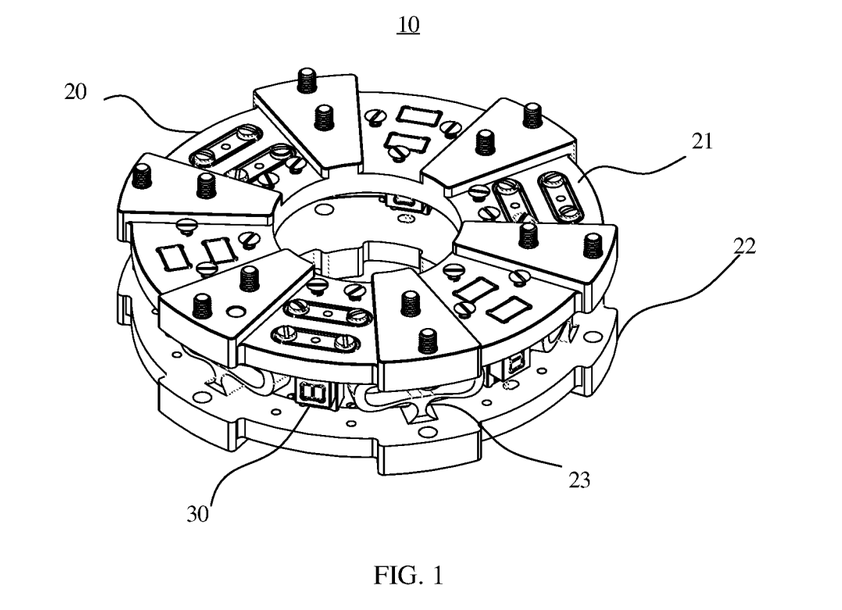
FIG. 1 is an isometric view of a force and torque sensor assembly according to an embodiment of the present disclosure.
Figure 2:
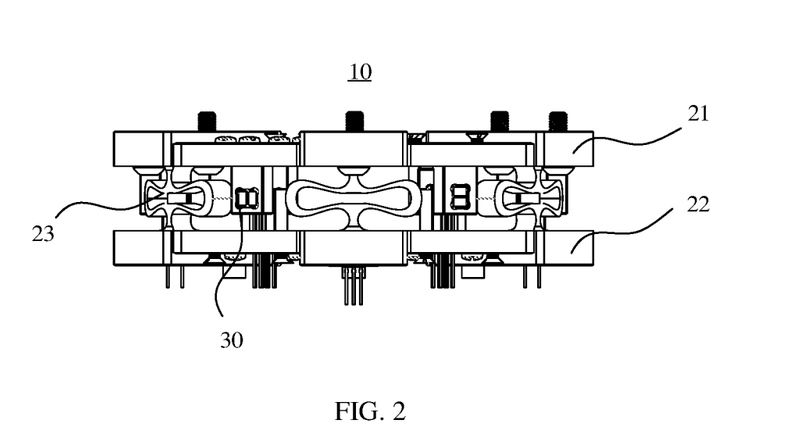
FIG. 2 is a side view of the force and torque sensor assembly in FIG. 1.

The force and torque sensor assembly of the present disclosure is described in detail below with reference to various embodiments. FIG. 1 is an isometric view of an exemplary force and torque sensor assembly 10 according to an embodiment of the present disclosure. FIG. 2 is a side view of the force and torque sensor assembly 10 shown in FIG. 1. In this embodiment, the force and torque sensor assembly 10 includes a body 20 and a plurality of sensing assemblies 30 mounted to the body 20. The body 20 includes a first component 21, a second component 22, and a plurality of deformable members 23 disposed between and connecting the first component 21 and the second component 22. The first component 21 and a second component 22 may be, for example, round plates, respectively. When either of the first component 21 or the second component 22 is subjected to a force or a torque, the deformable members 23 deform elastically and a relative motion between the first component 21 and the second component 22 (hereinafter "motion" or "relative motion" for short) occurs. The sensing assemblies 30 may be configured to detect this motion between the first component 21 and the second component 22. Based on the detected motion as well as the property of the deformable member 23, the force or torque applied on the first component 21 or the second component 22 can be determined. A basic structure of an exemplary force and torque sensor assembly can be referred to the Applicant's previous patent application (U.S. patent application Ser. No. 16/456,562), the contents of which are incorporated by reference into the present application.

Figure 3:
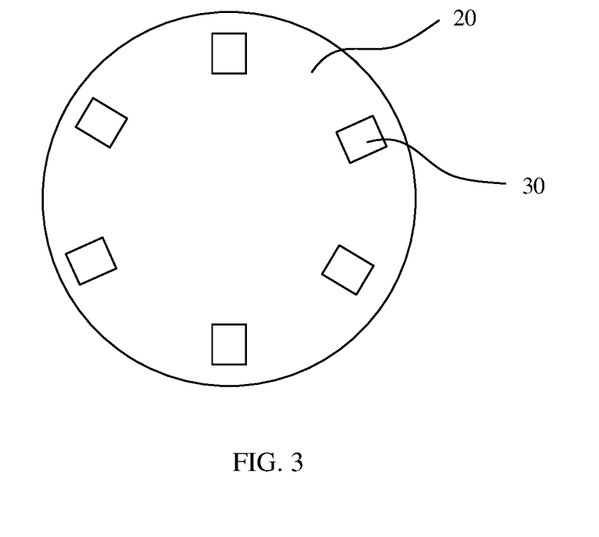
FIG. 3 shows an exemplary distribution of sensing assemblies of a force and torque sensor assembly according to an embodiment of the present disclosure.
Figure 4:
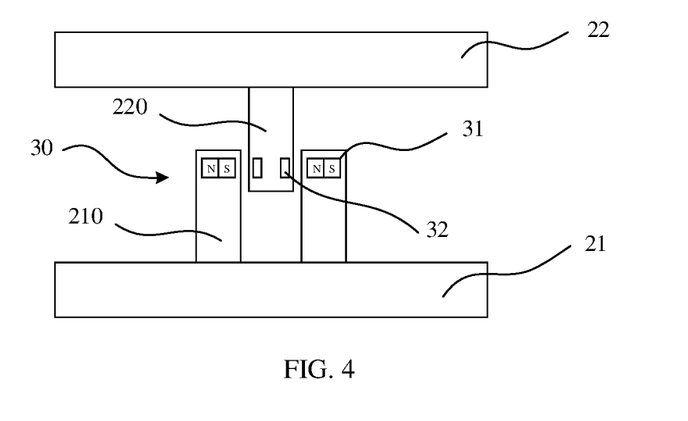
FIG. 4 is a schematic view of a sensing assembly mounted to a body of a force and torque sensor assembly according to an embodiment of the present disclosure.
Figure 5:
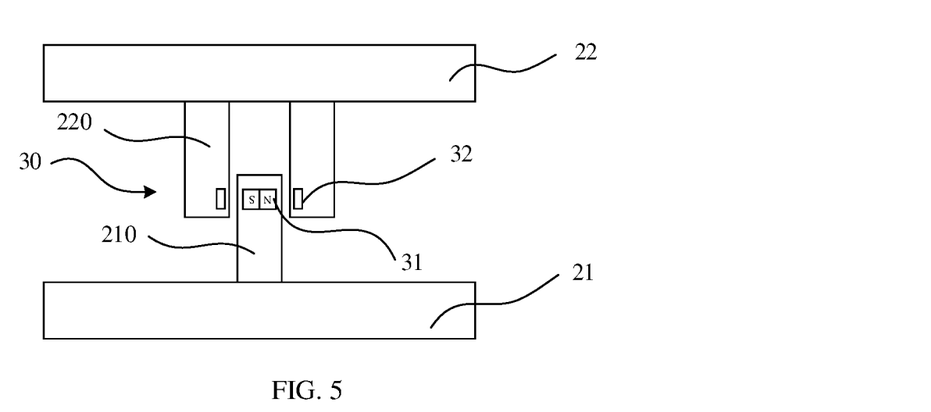
FIG. 5 is a schematic view of a sensing assembly mounted to a body of a force and torque sensor assembly according to another embodiment of the present disclosure.

Referring to FIG. 3, in an embodiment, a plurality of sensing assemblies 30 are circumferentially arranged on the force and torque sensor assembly 10. Each sensing assembly 30 includes a magnet assembly 31 coupled to the first component 21 and a pair of hall-effect sensors 32 coupled to the second component 22. Referring to an exemplary structure shown in FIG. 4, the magnet assembly 31 is mounted on two first mounting legs 210 extending from the first component 21, and the pair of hall-effect sensors 32 are mounted on a second mounting leg 220 extending from the second component 22. The second mounting leg 220 is located between the two first mounting legs 210 such that the sensing assembly 30 can be configured in the manners as shown in FIGS. 6-9. Referring to another exemplary structure shown in FIG. 5, the magnet assembly 31 mounted on a first mounting leg 210 extending from the first component 21, and the pair of hall-effect sensors 32 are respectively mounted on two second mounting legs 220 extending from the second component 22. The first mounting leg 210 is located between the two second mounting legs 220 such that the sensing assembly 30 can be configured in the manners as shown in FIGS. 10-13. According to the embodiments illustrated in FIGS. 4-5, the two hall-effect sensors 32 of the sensing assembly 30 are coupled to each other by fixing to the same member (i.e. the second component 22), and thereby move synchronously. Similarly, according the embodiment illustrated in FIG. 4, two sets of magnets of the magnet assembly 31 are coupled to each other by fixing to the same member (i.e. the first component 21), and thereby move synchronously.

It should be understood, embodiments shown in FIGS. 1-5 are merely illustrative. The structure of the force and torque sensor assembly of the present disclosure may be configured in different ways. For example, in one embodiment, the first component and the second component of the force and torque sensor assembly may be an inner ring and an outer ring respectively, and are thus arranged in an inner-outer configuration other than the up-down configuration as shown in FIGS. 1-3. In one embodiment, the force and torque sensor assembly may only have one set of sensing assembly described herein which serves to detect force or torque in one direction. In another embodiment, the number of the sensing assemblies included in the force and torque sensor assembly may be larger than six, which may achieve redundant measurement.

FIGS. 6-13 illustrate the configurations of the sensing assemblies 30 according to different embodiments, respectively. For illustration purposes, each exemplary sensing assembly 30 is described with a respective Cartesian coordinate system having an X axis, a Y axis and a Z axis that are perpendicular to one another.

It will be understood by one of ordinary skill in the art that the hall-effect sensors 32 may be calibrated in advance so that the hall-effect sensors output, for example, zero when the force and torque sensor assembly 10 is not subject to any force or torque.

In the embodiments shown in FIGS. 6-9, a pair of hall-effect sensors are located on opposite sides of the magnet assembly. Referring to the sensing assembly 30a shown in FIG. 6, sensing directions of the pair of the hall-effect sensors 32a both point to the magnet assembly 31a so as to detect a magnetic flux component changes in the Z direction, that is, the sensing directions of the two hall-effect sensors 32a are opposite. In this embodiment, the magnet assembly 31*a* includes a single magnet with a magnetization direction perpendicular to a connection line of the pair of hall-effect sensors 32*a*. Based on this configuration, a relative motion between the hall-effect sensors 32*a* and the magnet assembly 31*a* in the X direction brings the same magnetic field change to the hall-effect sensors 32*a*, and thus the signals of the hall-effect sensors 32*a* change identically in response to the relative X-direction motion between the hall-effect sensors 32*a* and the magnet assembly 31*a*. In contrast, a relative motion in the Z direction brings different magnetic field changes to the hall-effect sensors 32*a*, e.g., one of the hall-effect sensors 32*a* may sense more magnetic flux in its sensing direction while the other hall-effect sensor 32*a* may sense less magnetic flux in its sensing direction. Therefore, the relative motion between the hall-effect sensors 32*a* and the magnet assembly 31*a* in the Z direction causes the hall-effect sensors 32*a* to generate substantially equal but opposite signal changes.

Figure 6:
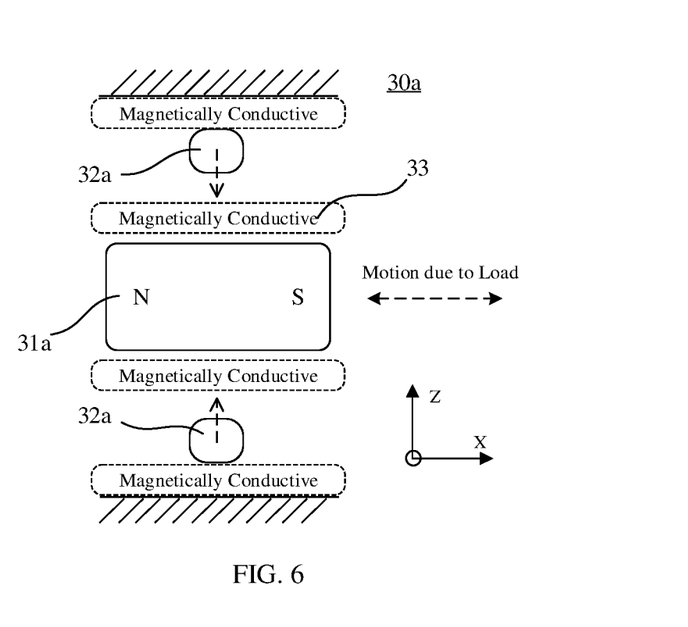
FIG. 6 is a schematic diagram of a structure of a sensing assembly according to an embodiment of the present disclosure.

Therefore, if the sensing assembly 30*a* is configured to detect a dominant motion in the X direction, an averaging method may be used. Specifically, by merging the signals of the two hall-effect sensors 32*a*, the sensor signals caused by the relative motion between the hall-effect sensors 32*a* and the magnet assembly 31*a* in the X direction are aggregated (i.e. two times as a signal caused by a single hall-effect sensor) while the sensor signals caused by a relative motion in the Z direction can be reduced or eliminated. Consequently, a clean and linear signal can be obtained which is only affected by the relative motion in the X direction. However, if the main investigated motion of the sensing assembly 30*a* is configured as the Z direction, a differential method can be used instead of averaging as described above. Specifically, by subtracting the sensor signals, the sensor signals caused by the motion in the Z direction are aggregated while the sensor signals caused by motions in the X direction can be reduced or eliminated. It should be noted that although the sensor signal for the detection of the motion in the Z direction may not be as linear as that for the detection of the motion in the X direction, the sensing assembly 30*a* is capable of detecting the relative motion in the Z direction between the hall-effect sensors 32*a* and the magnet assembly 31*a*.

Figure 7:
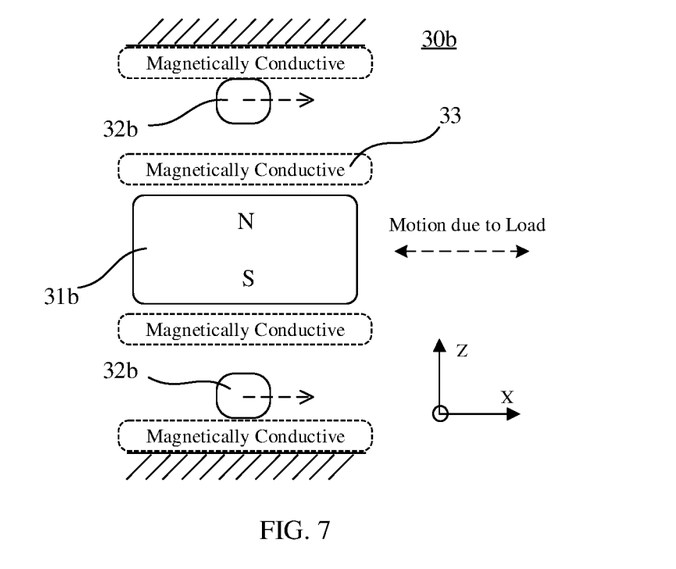
FIG. 7 is a schematic diagram of a structure of a sensing assembly according to another embodiment of the present disclosure.

Referring to the sensing assembly 30*b* shown in FIG. 7, the hall-effect sensor 32*b* have same sensing directions that are perpendicular to a connection line of the two hall-effect sensors 32*b* (i.e., in the X direction) so as to detect a magnetic flux component changes in the X direction. The magnet assembly 31*b* includes a single magnet with a magnetization direction parallel to the connection line of the pair of hall-effect sensors 32*b* (e.g., each pole of the magnet faces a corresponding hall-effect sensor 32*b*). Based on this configuration, a relative motion between the hall-effect sensors 32*b* and the magnet assembly 31*b* in the X direction enables the two hall-effect sensors 32*b* to sense the same change in flux sparsity, while the sensed flux are in opposite directions. Thus, the relative motion in the X direction causes the hall-effect sensor 32*b* to generate substantially equal but opposite sensor signals. In contrast, a relative motion between the hall-effect sensors 32*b* and the magnet assembly 31*b* in the Z direction enables the two hall-effect sensors 32*b* to sense opposite changes in flux sparsity, and meanwhile the sensed flux are also in opposite directions. Thus, the relative motion in the Z direction causes the hall-effect sensors 32*b* to generate substantially identical sensor signals.

Therefore, if the sensing assembly 30*b* is configured to detect a dominant motion in the X direction, a differential method may be used. Specifically, by subtracting the sensor signals, the sensor signals caused by the relative motion in the X direction are aggregated while the sensor signals caused by relative motions in the Z direction can be reduced or eliminated. Consequently, a clean and linear signal can be obtained which is only affected by the relative motion in the X direction. If a dominant relative motion in the Z direction is to be detected, an averaging method may be used instead. By merging the signals of the two hall-effect sensors 32*b*, the sensor signals caused by the relative motion in the Z direction are aggregated while the sensor signals caused by relative motions in the X direction can be reduced or eliminated.

Figure 8:
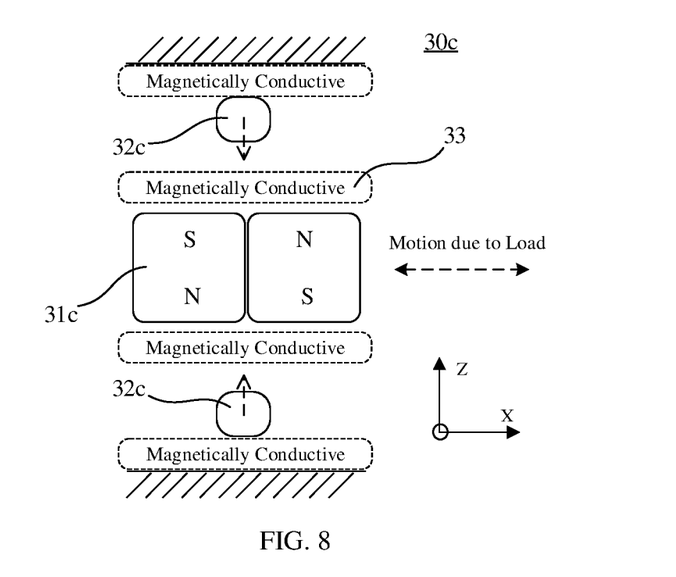
FIG. 8 is a schematic diagram of a structure of a sensing assembly according to another embodiment of the present disclosure.
Figure 9:
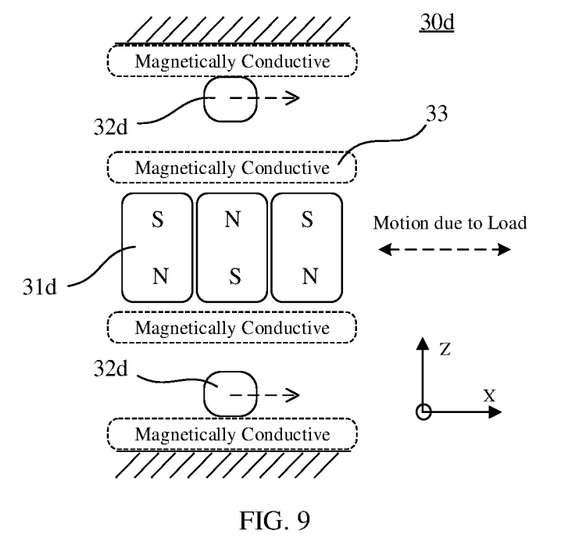
FIG. 9 is a schematic diagram of a structure of a sensing assembly according to another embodiment of the present disclosure.

The embodiments shown in FIGS. 8 and 9 each employ a magnet assembly having magnets arranged side by side with alternating opposite magnetization directions. The magnetization directions of the magnets are all parallel to a connection line of the pair of the hall-effect sensor. Referring to the sensing assembly 30*c* in FIG. 8, the sensing directions of the pair of the hall-effect sensors 32*c* both point to the magnet assembly 31*c* so as to detect a magnetic flux component changes in the Z direction. The magnet assembly 31*c* includes two magnets with opposite magnetization directions both parallel to a connection line of the pair of hall-effect sensors 32*c* (e.g., two poles of each magnet each face a corresponding hall-effect sensor 32*c* respectively). Based on this configuration, the relative motion between the hall-effect sensors 32*c* and the magnet assembly 31*c* in the X direction enables the two hall-effect sensors 32*c* to sense the same change in flux sparsity, while the sensed flux are in opposite directions (since the sensing directions of the two hall-effect sensors 32*c* are opposite). Thus, the motion in the X direction causes the hall-effect sensor 32*c* to generate substantially equal but opposite sensor signals. In contrast, the relative motion in the Z direction enables the two hall-effect sensors 32*c* to sense opposite changes in flux sparsity, and meanwhile the sensed magnetic flux are also in opposite directions. Thus, the motion in the Z direction causes the hall-effect sensors 32*c* to generate substantially identical sensor signals.

Therefore, if the sensing assembly 30*c* is configured to detect a dominant relative motion in the X direction, a differential method may be used. Specifically, by subtracting the sensor signals, the sensor signals caused by the relative motion in the X direction are aggregated while the sensor signals caused by relative motions in the Z direction can be reduced or eliminated. Consequently, a clean and linear signal can be obtained which is only affected by the motion in the X direction. If a dominant relative motion in the Z direction is to be detected, an averaging method may be used instead. By merging the signals of the two hall-effect sensors 32*c*, the sensor signals caused by the relative motion in the Z direction are aggregated while the sensor signals caused by relative motions in the X direction can be reduced or eliminated.

The sensing assembly 30*d* as shown in FIG. 9 differs from the sensing assembly 30*c* in that, the magnet assembly 31*d* includes three magnets with alternating opposite magnetization directions, and the sensing directions of the hall-effect sensors 32*d* are perpendicular to a connection line of the two hall-effect sensors 32*d* (i.e., in the X direction) so as to detect the magnetic flux component changes in the X direction. The operation of the sensing assembly 32*d* is similar to that of the sensing assembly 32*c* in FIG. 8. That is, the relative motion between the hall-effect sensors 32*d* and the magnet assembly 31*d* in the X direction causes the two hall-effect sensors 32*d* to generate substantially equal but opposite signals, while the relative motion in the Z direction causes the two hall-effect sensors 32*d* to generate substantially identical signals. Therefore, with appropriate algorithms, it is also possible to detect a dominant relative motion either in the X direction or in the Z direction.

It can be understood that more magnets with alternating magnetization directions can be used, which all allow for detection of a dominant motion while eliminating interference from motions in other directions. The difference resides in that more magnets can provide a stronger magnetic field, while may also introducing a different linearity between the motions and the sensor signals.

It should also be noted, for all embodiments shown above, the sensing directions of the hall sensors and the magnets arrangement direction can be different, as long as the two hall-effect sensors generate substantially identical signals in response to a first relative motion between the hall-effect sensors and the magnet assembly and generate substantially equal but opposite signals in response to a second relative motion perpendicular to the first relative motion between the hall-effect sensors and the magnet assembly. For example, in another embodiment, the sensing directions of the hall-effect sensors 32*a* in FIG. 6 may be changed to point the positive or negative X-direction. In this configuration, the two hall-effect sensors 32*a* may also generate substantially identical signals in response to a relative motion between the hall-effect sensors 32*a* and the magnet assembly 31*a* in the X direction and may also generate substantially equal but opposite signals in response to a relative motion between the hall-effect sensors 32*a* and the magnet assembly 31*a* in the Z direction. This configuration may increase the sensor nonlinearity to some extent but still workable.

Alternatively, the relative arrangement between the magnets and the hall sensors 32 can be reverted. Referring to the embodiments shown in FIGS. 10-13, the magnet assembly includes a first set of magnets and a second set of magnets, and a pair of sensor hall-effect sensors are located between the first set of magnets and the second set of magnets. The first set of magnets and the second set of magnets are coupled to each other (e.g., fixed to the same support), which means these two sets of magnets move together.

Figure 10:
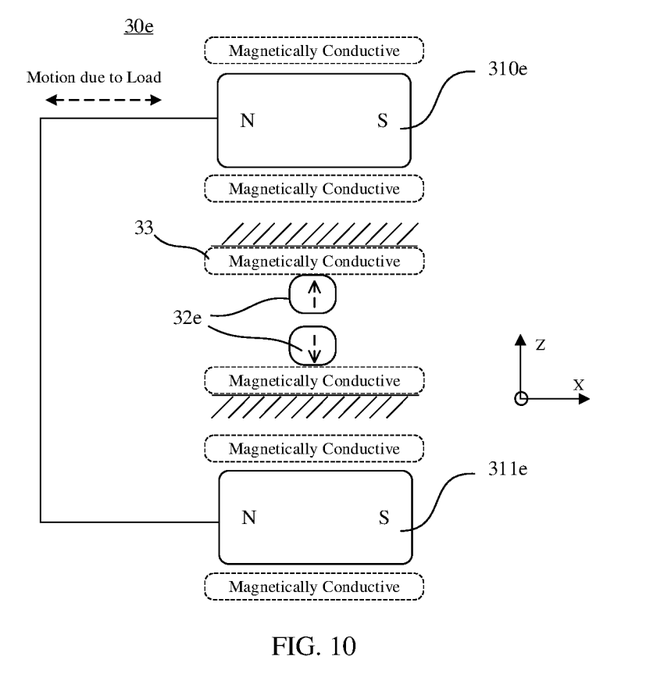
FIG. 10 is a schematic diagram of a structure of a sensing assembly according to another embodiment of the present disclosure.

Referring to the sensing assembly 30*e* shown in FIG. 10, sensing directions of the pair of the hall-effect sensors 32*e* respectively point to two sets of the magnet 310*e*, 311*e* so as to detect a magnetic flux component in the Z direction. The first set of magnets 310*e* and the second set of magnets 311*e* each include a single magnet with the same magnetization direction perpendicular to a connection line of the pair of hall-effect sensors 32*e*. Based on this configuration, the relative motion in the X direction causes the pair of hall-effect sensors 32*e* to sense same magnetic flux changes and thus generate identical signal changes. The relative motion in Z direction, however, enable one of the hall-effect sensors 32*e* to sense more magnetic flux in its sensing direction, and the other to sense less magnetic flux in its sensing direction, and thus cause the pair of hall-effect sensors 32*e* to generate substantially equal but opposite signal changes. Therefore, if the sensing assembly 30*e* is configured to detect a dominant relative motion in the X direction, an averaging method may be used, and a clean and linear signal can be obtained which is only affected by the motion in the X direction. However, if a motion in the Z direction is to be detected, a differential method can be used instead.

Figure 11:
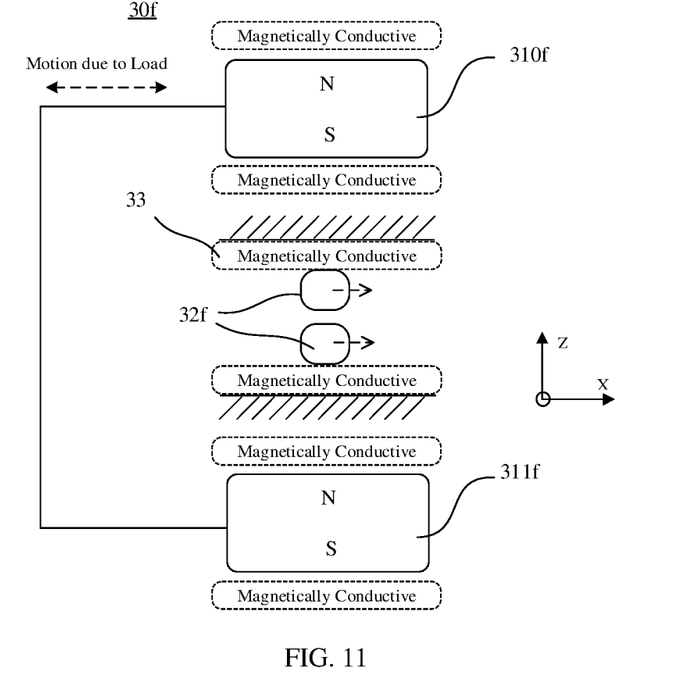
FIG. 11 is a schematic diagram of a structure of a sensing assembly according to another embodiment of the present disclosure.

Referring to the sensing assembly 30*f* shown in FIG. 11, the hall-effect sensors 32*f* have identical sensing directions that are perpendicular to a connection line of the two hall-effect sensors 32*f* (i.e., in the X direction) so as to detect a magnetic flux component in the X direction. The first set of magnets 310*f* and the second set of magnets 311*f* each include a single magnet with the same magnetization direction that is parallel to the connection line of the pair of hall-effect sensors 32*g*. Based on this configuration, the relative motion in the X direction causes the pair of the hall-effect sensors 32*f* to sense the same magnetic flux changes in sparsity, while the sensed flux are in opposite directions. Thus, the relative motion in the X direction causes the hall-effect sensors 32*f* to generate substantially equal but opposite signal changes. In contrast, the relative motion in the Z direction causes the two hall-effect sensors 32*f* to sense opposite magnetic flux in sparsity, and meanwhile the sensed flux are also in opposite directions. Thus, the motion in the Z direction causes the hall-effect sensors 32*f* to generate substantially same signal changes. Therefore, if the sensing assembly 30*g* is configured to detect a dominant relative motion in the X direction, a differential method may be used, and a clean and linear signal can be obtained which is only affected by the motion in the X direction. However, if a relative motion in the Z direction is to be detected, an averaging method can be used instead.

Figure 12:
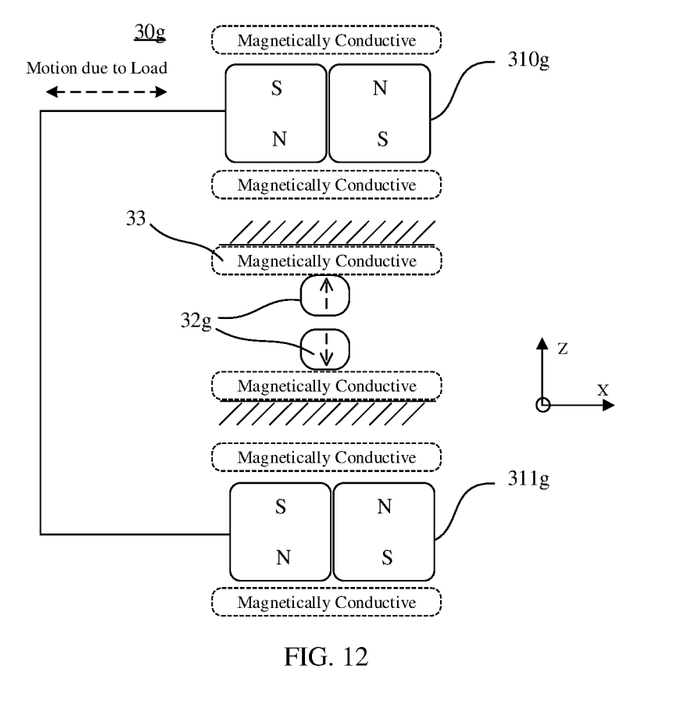
FIG. 12 is a schematic diagram of a structure of a sensing assembly according to another embodiment of the present disclosure.
Figure 13:
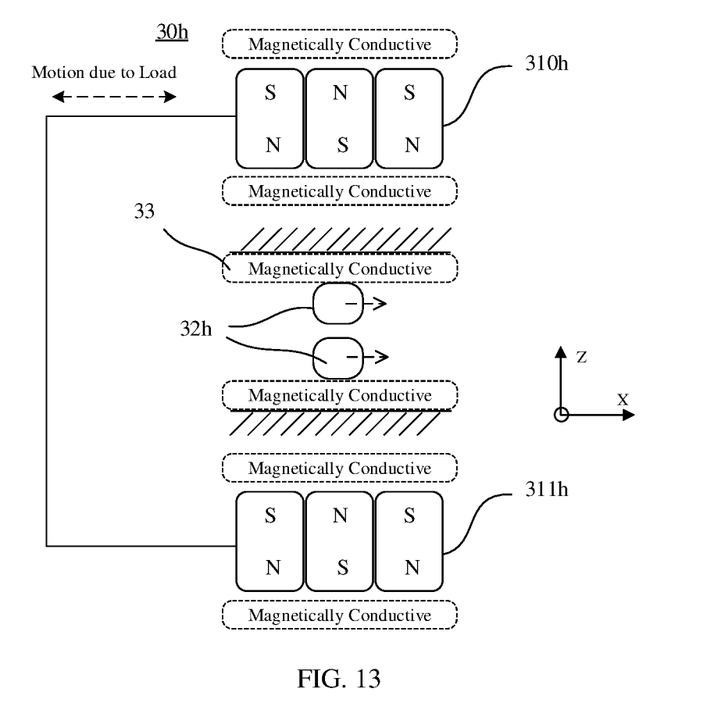
FIG. 13 is a schematic diagram of a structure of a sensing assembly according to another embodiment of the present disclosure.

In the embodiment of FIG. 12 and FIG. 13, the first set of magnets and the second set of magnets each include magnets arranged side by side with alternating opposite magnetization directions that are parallel to a connecting line of the pair of hall-effect sensors. Moreover, any two magnets on the same line parallel to the connection line of the two sensors (i.e., in the Z direction) have the identical magnetization direction.

Referring to the sensing assembly 30*g* in FIG. 12, the first set of magnets 310*g* and second set of magnets 311*g* each include two side-by-side magnets with alternating opposite magnetization directions. The sensing directions of the hall-effect sensor 32*g* point to the first set of magnets 310*g* and second set of magnets 311*g*, respectively, so as to detect the magnetic flux component changes in the Z direction. Based on this configuration, the relative motion in the X direction causes the hall-effect sensors 32*g* to sense the same magnetic flux in sparsity, while the sensed flux are in opposite directions. Thus, the relative motion in the X direction causes the hall-effect sensors 32*g* to generate substantially equal but opposite signal changes. In contrast, the relative motion in the Z direction causes the two hall-effect sensors 32*g* to sense opposite magnetic flux in sparsity, and meanwhile the sensed flux are also in opposite directions. Thus, the relative motion in the Z direction causes the hall-effect sensors 32*g* to generate substantially same signal changes. Therefore, if the sensing assembly 30*g* is configured to detect a dominant motion in the X direction, a differential method may be used, and a clean and linear signal can be obtained which is only affected by the motion in the X direction. However, if a relative motion in the Z direction is to be detected, an averaging method can be used instead.

Referring to the sensing assembly 30*h* in FIG. 13, the first set of magnets 310*h* and the second set of magnets 311*h* each have three side-by-side magnets having alternating opposite magnetization directions. The sensing direction of the hall-effect sensors 32*h* are perpendicular to a connection line of the two hall-effect sensors 32*h* (i.e., in the X direction) so as to detect the magnetic flux component in the X direction. The operation of the sensing assembly 30*h* is similar to that of the embodiment in FIG. 12, i.e., the relative motion in the X direction causes the two hall-effect sensors 32*h* to generate substantially equal but opposite signal changes, and the relative motion in the Z direction causes the two hall-effect sensors 32*h* to generate substantially identical signal changes. Therefore, with appropriate algorithms, it is also possible to detect a dominant motion either in the X direction or in the Z direction.

It can be understood that in the configuration of FIGS. 12-13, more magnets with alternating magnetization directions can be used, which all allow for detection of a dominant motion while eliminating interference from motions in other directions. The difference resides in that more magnets can provide a stronger magnetic field, while may also introducing a different linearity between the motion and the sensor signals.

Similar to embodiments described in FIGS. 6-9, for all embodiments shown in FIGS. 10-13, the sensing directions of the hall sensors and the magnets arrangement direction can be different, as long as the two hall-effect sensors generate substantially identical signals in response to a first relative motion between the hall-effect sensors and the magnet assembly and generate substantially equal but opposite signals in response to a second relative motion perpendicular to the first relative motion between the hall-effect sensors and the magnet assembly. For example, in a modified embodiment of the sensing assembly shown in FIG. 10, the sensing directions of the hall-effect sensors may be changed to point the positive or negative X-direction. In this configuration, the two hall-effect sensors may also generate substantially identical signals in response to a relative motion between the hall-effect sensors and the magnet assembly in the X direction and may also generate substantially equal but opposite signals in response to a relative motion between the hall-effect sensors and the magnet assembly in the Z direction. This configuration may increase the sensor nonlinearity to some extent but still workable.

In the embodiments showing in FIGS. 6-13, the two sensors are symmetrically arranged, with the connection line therebetween being either perpendicular or parallel to the sensing direction of the sensors or the magnetization direction of a magnet. However, it can be understood that, in practical applications, the position of the two sensors may be slightly misaligned, and thus the connection line of the two sensors is substantially perpendicular or parallel to the sensing direction or the magnetization direction.

In the configuration of each sensor assembly 30a-30h as described above, the magnet-sensor signal properties along the Y direction is assumed to be constant if the hall-effect sensors 32a-32h are not close to the edge of the magnets such that the edge effects of the magnets in the Y direction can be neglected.

According to each of the above embodiments, the sensing assembly 30 further includes a magnetically conductive assembly 33 for reshaping the magnetic field of the magnet assembly 31. The magnetically conductive assembly 33 may include magnetically conductive materials, including, for example, metal or alloy with a high permeability such as cast iron, silicon steel sheet, nickel-zinc ferrite, nickel-iron alloy, manganese-zinc ferrite. In a specific embodiment, the material of the magnetically conductive assembly 33 is carbon steel. The magnetically conductive material is distributed, for example, on both sides of a magnet and on both sides of the pair of hall-effect sensors 32.

According to the above embodiments, the sensing assembly 30a-30h uses a pair of hall-effect sensors 32a-32h to detect motions in multiple directions. In other embodiments, more pairs of sensors may be used, which may provide more accurate measurements of the loads applied on the force and torque sensor assembly 10.

With multiple hall-effect sensors, cross-checking and cross-monitoring between the multiple sensor signals can be achieved, especially if a motion in the nonlinear direction is not dominant. In the cases that one or more sensors or magnets are damaged or malfunctional, the causes can be quickly identified, which thus provides an extra safety for operation. Multiple sensors can also be used to suppress common mode noises, especially Gaussian electrical noises.

According to the embodiment shown in FIG. 3, a plurality of sensing assemblies 30 are circumferentially arranged on the force and torque sensor assembly 10. In other embodiments, the sensing assemblies 30 may be arranged in other manners, for example, the sensing assemblies 30 may be randomly distributed between the first component 21 and the second component 22.

The multiple sensing assemblies 30 may have the same configuration, for example, selected from any one of the sensing assemblies 30a-30h as shown in FIGS. 6-13. Alternatively, they may have different configurations, selected from sensing assemblies 30a-30h respectively. The multiple sensing components 30 can be simultaneously used to measure a force or torque applied on the force and torque sensor assembly 10, so that a more accurate result can be obtained by combining the output of these sensing assemblies 30. In a specific implementation, for example, two sensing assemblies 30 are each configured such that the pair of hall-effect sensors generate substantially identical signal changes, or each configured such that the pair of hall-effect sensors generate substantially equal but opposite signal changes in response to the same force or a torque applied on the force and torque sensor assembly. In another specific implementation, for example, one sensing assembly 30 is configured such that the pair of hall-effect sensors generate substantially identical signal changes in response to a force or a torque of the force and torque sensor assembly, and another sensing assembly 30 is configured such that the pair of hall-effect sensors generate substantially equal but opposite signal changes in response to the force or the torque. Regardless of how the two sensing assemblies 30 are configured, they are able to measure the same force or torque at the same time.

In addition, by arranging sensing assemblies 30 at different positons on the force and torque sensor assembly 10, multiple local displacements at the different positions between the first component 21 and the second component 22 can be detected. In addition, with multiple sensing assembly mounted on different positions, a global deflection of the force and torque sensor assembly 10 can be derived, and thus the total external force or torques can be determined based on the stiffness of the force and torque sensor assembly 10. For example, the detections of displacements at different positions would be particularly useful when detecting a shear force that causes the displacements at the different positions.

In an embodiment, the multiple sensing assemblies 30 may have different spatial orientations regardless of whether the configurations thereof are same or not. For example, the sensing assemblies 30 with any of the configurations shown in FIGS. 6-13 may be arranged on the body 20 such that the primary sensing directions thereof (e.g. the X direction) are along an axial direction, a radial direction, and a shear direction of the sensor assembly 10, respectively. By such a configuration, the force and torque sensor assembly 10 is capable of detecting forces or torques form multiple directions. For example, a force that is vertically applied on the force and torque sensor assembly 10 may cause X-direction motions for part of the sensing assemblies 30, and thus this part of the sensing assemblies 30 are suitable to measure the vertical force as they are able to generate linear sensor signals. However, if a torque that is around an axis of the torque sensor assembly 10 is applied, this part of the sensing assemblies 30 may not work because the torque may cause actually Y-direction motions to them. In this case, a sensing assembly 30 that is able to convert the torque to an X-direction motion is required, and the sensing assembly 30 may be at a 90 degrees with respect to the above ones.

It should be understood that the sensing directions of the hall-effect sensors 32 may change in each configuration. For example, in the embodiment shown in FIG. 6, the sensing directions of the hall-effect sensors 32 may be changed to be parallel to the magnetization direction of the magnet assembly 31. In the case that the sensing directions of the hall-effect sensors 32 are changed, the linearity, however, may be affected.

It can be understood that the sensing assembly of the present disclosure is not limited to detect a force or torque as described above, but can also be used in various applications where a motion or a displacement needs to be detected.

It should be noted that the terms "identical" and "same" that describe the sensor signal changes or flux changes in the present disclosure does not mean to represent that the signal changes or flux changes are exactly identical or exactly same, but they may be slightly deviated depending on the distribution of the magnetic flux. It should also be noted that the terms "linearity" and "linear" that describe the relationship between the sensor signals and the motion are not intended to mean that the signal changes with respect to motions are exactly linear.

The present disclosure also provides a robot and a robot joint used in the robot. The robot joint includes a force and torque sensor assembly 10 according to any of the embodiments as described above.

Figure 14:
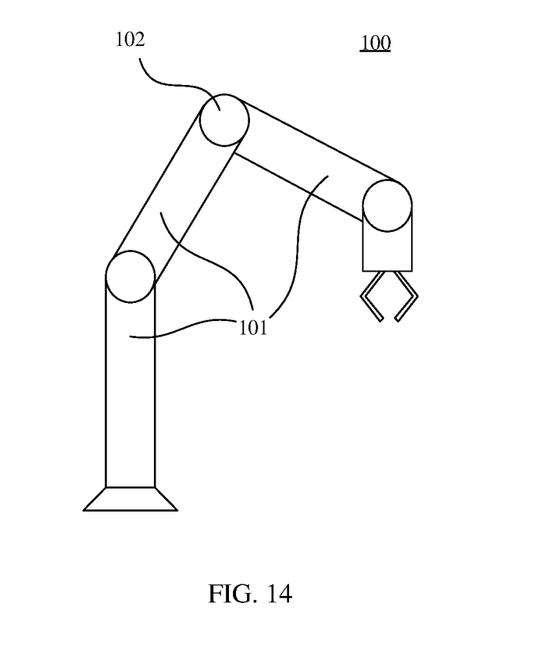
FIG. 14 is a schematic view of robot according to an embodiment of the present disclosure.

Referring to FIG. 14, one exemplary robot 100 is shown, which includes arms 101 and robot joints 102 connecting neighboring arms. The robot joint 102 has a force and torque sensor assembly, and the first component and the second component of the force and torque sensor assembly may be, for example, coupled to two neighboring arms 101 respectively.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "includes" when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A force and torque sensor assembly configured to detect a force or a torque applied thereon, the force and torque sensor assembly comprising:
   a body comprising a first component, a second component and a deformable member connecting the first component and second components; and
   at least two sensing assemblies mounted to the body and configured to detect a relative motion between the first component and the second component, each of the at least two sensing assemblies comprising a magnet assembly coupled to the first component and a pair of hall-effect sensors coupled to the second component,
   wherein the pair of hall-effect sensors are located respectively at opposite sides of the magnet assembly, or the magnet assembly comprises a first set of magnets and a second set of magnets, and the pair of hall-effect sensors are located between the first set of magnets and the second set of magnets,
   wherein the pair of hall-effect sensors are configured to generate substantially identical signal changes in response to a first relative motion in a first direction between the magnet assembly and the pair of sensors, and to generate substantially equal but opposite signal changes in response to a second relative motion in a second direction between the magnet assembly and the pair of sensors, the first direction being perpendicular to the second direction, and
   wherein the at least two sensing assemblies are configured to detect different relative motions respectively at the different positions between the first component and the second component.

2. The force and torque sensor assembly of claim 1, wherein the at least two sensing assemblies comprise two sensing assemblies arranged on the force and torque sensor assembly, the two sensing assemblies being configured such that, in response to the same force or torque applied on the force and torque sensor assembly, the pair of hall-effect sensors of each sensing assembly generate substantially identical signal changes, or configured such that, in response to the same force or torque applied on the force and torque sensor assembly, the pair of hall-effect sensors of each sensing assembly generate substantially equal but opposite signal changes.

3. The force and torque sensor assembly of claim 1, wherein the at least two sensing assemblies comprise two sensing assemblies arranged on the force and torque sensor assembly, one of which is configured such that such that the pair of hall-effect sensors generate substantially identical signal changes in response to a force or a torque applied on the force and torque sensor assembly, and the other of which is configured such that the pair of hall-effect sensors generate substantially equal but opposite signal changes in response to the same force or torque.

4. The force and torque sensor assembly of claim 1, wherein the magnet assembly comprises at least two magnets arranged side by side with alternating opposite magnetization directions which are all substantially parallel to a connection line of the pair of the hall-effect sensors.

5. The force and torque sensor assembly of claim 1, wherein the first set of magnets and the second set of magnets each comprises a single magnet, the magnet of the first set of magnets and the magnet of the second set of magnets having same magnetization directions substantially perpendicular to a connection line of the pair of the hall-effect sensors.

6. The force and torque sensor assembly of claim 1, wherein the first set of magnets and the second set of magnets each comprise a single magnet, the magnet of the first set of magnets and the magnet of the second set of magnets having same magnetization directions substantially parallel to a connection line of the pair of the hall-effect sensors.

7. The force and torque sensor assembly of claim 1, wherein the first set of magnets and the second set of magnets each comprise at least two magnets arranged side by side with alternating opposite magnetization directions that are substantially parallel to a connection line of the hall-effect sensors, and the magnet of the first set of magnets and the magnet of the second set of magnets on a same line substantially parallel to the connection line have same magnetization directions.

8. The force and torque sensor assembly of claim 1, wherein the pair of hall-effect sensors each have a sensing direction point to the magnet assembly, or have same sensing directions substantially perpendicular to a connection line of the pair of hall-effect sensors.

9. The force and torque sensor assembly of claim 1, wherein each of the at least two sensing assemblies further comprises a magnetically conductive assembly configured to reshape a magnetic field of the magnet assembly.

10. A robot joint, comprising a force and torque sensor assembly configured to detect a force or a torque applied thereon, the force and torque sensor assembly comprising:
a body comprising a first component, a second component and a deformable member connecting the first component and second components, and
at least two sensing assemblies mounted with the body and configured to detect a relative motion between the first component and the second component, each of the at least two sensing assemblies comprising a magnet assembly coupled to the first component and a pair of hall-effect sensors coupled to the second component, wherein the pair of hall-effect sensors are configured to generate substantially identical signal changes in response to a first relative motion in a first direction between the magnet assembly and the pair of sensors, and to generate substantially equal but opposite signal changes in response to a second relative motion in a second direction between the magnet assembly and the pair of sensors, the first direction being perpendicular to the second direction,
wherein the pair of hall-effect sensors are located respectively at opposite sides of the magnet assembly, or the magnet assembly comprises a first set of magnets and a second set of magnets, and the pair of hall-effect sensors are located between the first set of magnets and the second set of magnets,
wherein the at least two sensing assemblies are configured to detect different relative motions respectively at the different positions between the first component and the second component.

11. The force and torque sensor assembly of claim 10, wherein the magnet assembly comprises a single magnet with a magnetization direction substantially perpendicular to a connection line of the pair of the hall-effect sensors.

12. The force and torque sensor assembly of claim 10, wherein the magnet assembly comprises a single magnet with a magnetization direction substantially parallel to a connection line of the pair of the hall-effect sensors.

* * * * *